(12) United States Patent
Moulin et al.

(10) Patent No.: US 11,498,356 B2
(45) Date of Patent: Nov. 15, 2022

(54) HOT STAMPING FOR DECORATING A PART OF A VEHICLE BODY

(71) Applicant: COMPAGNIE PLASTIC OMNIUM, Lyons (FR)

(72) Inventors: Gilles Moulin, Chazey-sur-Ain (FR); Claire D'Achon, Vaulx-en-Velin (FR)

(73) Assignee: COMPAGNIE PLASTIC OMNIUM, Lyons (FR)

( * ) Notice: Subject to any disclaimer, the term of this patent is extended or adjusted under 35 U.S.C. 154(b) by 0 days.

(21) Appl. No.: 15/734,339

(22) PCT Filed: Jun. 4, 2019

(86) PCT No.: PCT/EP2019/064400
§ 371 (c)(1),
(2) Date: Dec. 2, 2020

(87) PCT Pub. No.: WO2019/233972
PCT Pub. Date: Dec. 12, 2019

(65) Prior Publication Data
US 2021/0221165 A1 Jul. 22, 2021

(30) Foreign Application Priority Data
Jun. 5, 2018 (FR) ...................................... 1854866

(51) Int. Cl.
*B44C 1/17* (2006.01)
*B41F 16/00* (2006.01)
*H02K 5/128* (2006.01)
*B32B 38/14* (2006.01)
(Continued)

(52) U.S. Cl.
CPC .......... *B44C 1/1729* (2013.01); *B41F 16/008* (2013.01); *B41F 16/0046* (2013.01); *H02K 5/128* (2013.01); *B29C 48/0021* (2019.02); *B32B 38/14* (2013.01); *B44C 1/24* (2013.01)

(58) Field of Classification Search
CPC .. B41F 16/0046; B41F 16/008; B44C 1/1729; B44C 1/24; H02K 1/27; H02K 5/12; H02K 5/128; H02K 5/163; F04D 13/064; B29C 48/0021; B32B 38/14
See application file for complete search history.

(56) References Cited

U.S. PATENT DOCUMENTS 5,637,172 A * 6/1997 Kerr ...................... B44C 1/1729
156/581
2012/0242773 A1* 9/2012 Yasumatsu ........... B41M 7/0027
428/32.6
2017/0326860 A1* 11/2017 Ben ......................... B32B 37/02

FOREIGN PATENT DOCUMENTS

CN 101665041 A 3/2010
EP 1897700 A2 3/2008

OTHER PUBLICATIONS

English translation of PCT/EP2019/064400.*
(Continued)

*Primary Examiner* — Sonya M Sengupta
(74) *Attorney, Agent, or Firm* — M&B IP Analysts, LLC

(57) ABSTRACT

The device for hot stamping a part of a vehicle body is provided. The device includes a strip including a carrier film and a decorative film; at least one motorized arm capable of moving; at least one head mounted movably in rotation on one end of the arm, the head comprising pressure means capable of applying pressure on the strip; and means for unwinding the strip in front of the head.

22 Claims, 2 Drawing Sheets

(51) Int. Cl.
  *B44C 1/24*     (2006.01)
  *B29C 48/00*    (2019.01)

(56)         References Cited

OTHER PUBLICATIONS

The International Search Report and The Written Opinion of the International Searching Authority for PCT/EP2019/064400, dated Sep. 12, 2019, ISA/EPO, Rijswijk, The Netherlands.

* cited by examiner

HOT STAMPING FOR DECORATING A PART OF A VEHICLE BODY

CROSS-REFERENCE TO RELATED APPLICATIONS

This application claims priority under 35 U.S.C. § 371 to the International Application No. PCT/EP2019/064400, filed Jun. 4, 2019, and to the French Application No. 1854866, filed Jun. 5, 2018, now pending, the contents of which are hereby incorporated by reference.

The present disclosure relates to the automotive field, more particularly to the field of decorating parts of a vehicle body, for example grates, grilles, protective elements of an opening, tailgate strips, front or rear bumpers or roofs.

It is often necessary to improve the aesthetic appearance of parts of a vehicle body in order to make them more attractive to the consumer, or to stand out from competitors. Several methods are known, such as painting or printing patterns, for example by hot stamping. An example of a method and device for printing a pattern by hot stamping is described in document US 2017/326860.

However, such a device has the particular drawback of being bulky, expensive and complex to manufacture if it is desired to use it on parts of a vehicle body having complex shapes. Indeed, the device comprises an arm comprising a movable stamp, sliding vertically in line with a part to be decorated and a decorative film. This device is particularly suitable for flat parts. The bulk of the arm makes its use for parts with complex shapes complicated or even impossible for certain areas of the part of a vehicle body. In addition, adapting this device to make it easily usable with parts of a vehicle body having complex shapes would be expensive and complex.

Moreover, this device does not allow easy changing of the decorative film or suitable positioning of the decorative film relative to the area of the part to be decorated in the case of a decorative film with a pattern.

The object of the disclosed embodiments is in particular to address these drawbacks.

To this end, the disclosed embodiments relate to a device for hot stamping a part of a vehicle body, comprising:
  a strip comprising a carrier film and a decorative film;
  at least one motorized arm capable of moving;
  at least one head mounted movably in rotation on one end of the arm, the head comprising pressure means capable of applying pressure on the strip; and
  means for unwinding the strip in front of the head.

Thus, a device is obtained in which the head can perform movements with a large degree of freedom, which in particular allows it to reach and decorate portions of a surface of a part of a vehicle body to be decorated that are not reachable with another device. In particular, the arm is thus able to tilt the head in an orientation which allows it to be perpendicular to the different areas of the part of a vehicle body to be decorated, even if these areas are not all in the same plane or in planes parallel to one another. Once the arm has moved relative to the part of a vehicle body to be decorated, it is possible to provide for a rotation of the head in order to adjust the position of the latter so as to orient the film at different angles relative to the part. It is thus possible to adapt the orientation of the film to the geometry of the part to be decorated and therefore to reach portions of the part that would not be accessible otherwise. It is also possible to adapt the orientation of the film in order to obtain a particular aesthetic result, for example to impart a particular direction to a decorative pattern. In addition, these changes in orientation make it possible to optimize the surfaces of the decorative film which are used so as to waste as little as possible.

The strip thus comprises at least two thicknesses that are formed by the carrier film and the decorative film. The carrier film can be made of any material known to those skilled in the art as being capable of serving as a carrier film in a hot stamping method. For example, the carrier film can be made of poly(ethylene terephthalate) (PET). The decorative film can be made of any material known to those skilled in the art as being capable of serving as a decorative film in a hot stamping method. It can include color pigments, holograms or be metallic. The decorative film can for example be monochrome. Alternatively, the decorative film can comprise several different colors, or else transparent, translucent or semi-opaque areas. This decorative film can also have textured areas. Provision can be made for the decorative film to represent a gradient of the same color or of several different colors. Provision can also be made for the decorative film to include a pattern representing, for example, a particular geometric shape that can be repeated throughout the film. It is also possible to provide for several different patterns to follow one another throughout the film. It is of course possible to provide that the strip comprises other films or layers, for example an adhesive layer, a protective layer such as a varnish, or a peelable layer making it possible to facilitate the separation of the decorative film from the carrier film.

Advantageously, the decorative film comprises several decorative patterns that follow one another along the decorative film, at least one of the decorative patterns having a shape and/or a color and/or a texture that is different from the other decorative patterns.

In this way, it is possible to decorate a part of a vehicle body in a variety of ways with the same strip. More particularly, this feature, combined with the great freedom of movement of the arm and the head, makes it possible to decorate several parts of a part of a vehicle body of complex shape with different decorative patterns using a single device. This solution therefore has the advantage of being compact and economical. For example, provision can be made for the decorative film to comprise several repeated sequences of decorative patterns along the decorative film. For example, a sequence can comprise a series of decorative patterns in which at least one of the decorative patterns differs from the others by a shape and/or a color and/or a texture. Such a sequence can for example correspond to all of the decorative patterns intended to be applied to a given part of a vehicle body.

Advantageously, the pressure means are capable of pressing the strip against the part of a vehicle body.

In this way, the decorative film and/or any adhesive layer is in contact with the part of a vehicle body and can be transferred onto the latter during a hot stamping method. The pressure means make it possible to ensure proper application of the decorative film.

Provision can be made for the application means to have a shape that is adapted to the shape of the strip and/or of the decorative film and/or of any decorative pattern present on the decorative film. Preferably, the pressure means are positioned in line with a plane of the strip and are able to apply pressure in a direction normal to this plane.

Preferably, the pressure means are capable of being movable in rotation or in translation while applying pressure to the strip.

The suitable shape can thus be on the part of a vehicle body, with a "standard" pressure means. Pressure means capable of being movable in rotation may for example be of the roller type. Pressure means capable of being movable in translation may for example be of the pad type. In these two cases, the arm may for example be able to move the head along the area to be decorated by unwinding the strip and applying pressure at the same time.

Preferably, the head is removably mounted on the arm.

Thus, it is possible to remove the head from the arm and to replace it with another head. For example, it can be replaced with a new head once the head is worn. This solution is economically advantageous, since it avoids replacing the entire arm or device. Furthermore, it is possible to replace the head with another head having a decorative film different from the first head, for example a decorative film having a different color. Once again, this solution is economically advantageous, since it avoids having to use several devices and/or several arms when it is desired to deposit different decorative films on the same part of a vehicle body. Provision can be made for the device to include a support capable of receiving one or more heads. These heads are able to replace the removable head once the latter is removed from the arm. For example, provision can be made for the arm to be controlled to move towards the support capable of receiving the heads and to recover one of the heads present on this support. This change can be done automatically. For example, the device comprising the arm and a first head deposits a first decorative film on a first area to be decorated, then the first head is withdrawn from the arm and a second head is placed, this second head comprising a second decorative film different from the first, and a second area to be decorated is decorated with this second decorative film. At least as many heads can be provided as there are areas to be decorated. The use of several heads with a single arm not only presents an economic advantage, but also saves space, the device being more compact. When the change of head is done automatically, it also saves time and requires less labor. It is of course possible to provide that the motorized arm is a robot.

Preferably, the device comprises at least two motorized arms and at least two heads, the arms each carrying a respective head.

In this way, it is possible to speed up the hot stamping method. Provision can be made for the two heads to have the same decorative film. Provision can also be made for each head to have a different decorative film. This makes it possible for example to eliminate the step of changing the head in the case where the head is removable and is replaced in order to change the decorative film.

Advantageously, the head comprises the unwinding means and/or the strip.

The device is thus more compact. In addition, it is particularly advantageous to be able to move the strip and its unwinding means at the same time as the head. This ensures that the strip is always well positioned relative to the head in order to allow proper application of the film.

In one embodiment, the unwinding means are made up of a pair of rollers, and the pair of rollers being a first pair and the strip being a first strip, the head further comprises at least one second pair of rollers capable of unwinding a second strip and pressure means capable of applying pressure to the second strip.

A more compact device is thus obtained. Provision can be made for the same head to include two different films each suitable, for example following a rotation of the head, to be opposite a part of a vehicle body to be decorated.

In one particular embodiment, provision can be made for two heads to be mounted so as to be able to rotate on the end of the arm. Again, the device is more compact in this way.

Advantageously, the pressure means comprise at least one stamp.

The stamp is for example able to press against one face of the strip, preferably against one face of the carrier film. In one preferred embodiment, the head comprises several stamps having different shapes and/or dimensions.

Preferably, the stamp is able to cut at least a portion of the strip.

More preferably, the portion of the strip which is cut comprises at least part of the decorative film. The carrier film itself is deformed under the action of the stamp but is not cut. It is thus possible to deposit the decorative film on the part of a vehicle body to be decorated while maintaining a continuous strip. Provision can be made for any adhesive layer and/or any protective layer also to be cut by the stamp. In one preferred embodiment, the stamp is adapted to the profile of the area to be decorated.

Preferably, the stamp is removably mounted on the head.

It is thus possible to replace the stamp, either because it is worn, or in order to use a stamp having a different shape and/or different dimensions.

Advantageously, the head comprises several stamps.

Preferably, the stamps have different dimensions and/or shapes.

Provision can be made for the device to include a member capable of changing the stamp used. It is thus possible to adapt the stamp used (its shape and/or its dimensions) to the area of the part to be decorated and/or to the decorative film. This change can of course be made before a hot stamping method or during the method.

Advantageously, the pressure means are suitable for applying a pressure of between 30 and 40 kg/cm$^2$ on the strip.

These are the pressure values for obtaining a good hot stamping result. In particular, they allow a good impression of the decorative film on the part of a vehicle body to be decorated. Too little pressure can cause the decorative film to imprint incorrectly. Too much pressure can cause degradation of the strip, whether it is the decorative film or the carrier film.

Preferably, the device comprises means for heating the pressure means to a temperature between 120° C. and 250° C., preferably between 200° C. and 215° C.

These temperatures allow better hot stamping to be obtained. More particularly, this temperature range makes it possible to ensure the separation of the decorative film from the strip and allows its impression on the part of a vehicle body. Too low a temperature presents a risk that separation and/or printing will not take place completely, if at all. Too high a temperature presents a risk that the decorative film and/or the carrier film will be degraded. Those skilled in the art can adapt the temperature used as a function of the number and nature of the films included in the strip.

The disclosed embodiments also relate to a hot stamping method using a device as described above.

Preferably, in this method:
- a movement of the motorized arm carrying the head is controlled and a rotation of the head relative to the arm is controlled so as to have the head facing a surface intended to be hot stamped,
- a pressure is applied between 30 and 40 kg/cm$^2$ using pressure means on the strip comprising the decorative pattern pressed against the surface intended to be hot stamped, and heating is done to a temperature between 120° C. and 250° C., preferably between 200° C. and 215° C.

As indicated above, the movement of the motorized arm and the rotation of the head make it possible to obtain a large degree of freedom of movement, and thus to be able to stamp parts of a vehicle body having complex shapes. This makes it possible in particular to stamp areas of a bodywork part which lie in different planes, or more particularly, areas of a part of a vehicle body which do not lie in planes that are parallel to one another.

The pressure and temperature values, as mentioned above, allow a better hot stamping result.

Preferably, the head is changed for another head after having hot stamped the surface intended to be hot stamped.

Advantageously, the pressure means comprise a stamp corresponding to an area to be decorated, the method further comprising a step in which the stamp is changed for another stamp having different dimensions and/or a different shape.

Advantageously, the previous steps of the method having made it possible to carry out hot stamping of the surface with one of the decorative patterns of the decorative film, the method further comprises the following steps:

controlling a movement of the motorized arm carrying the head and controlling a rotation of the head relative to the arm so as to have the head facing a surface intended to be hot stamped that is different from the surface previously hot stamped, unwinding the strip in front of the head so as to place a portion of the decorative film facing the pressure means, said portion comprising a decorative pattern having a shape and/or a color and/or a texture which is different from that of the decorative pattern previously applied, applying pressure between 30 and 40 kg/cm$^2$ using pressure means on the strip comprising the decorative pattern pressed against the surface intended to be hot stamped, and heating to a temperature between 120° C. and 250° C., preferably between 200° C. and 215° C.

In this way, the hot stamping method is faster and more economical, since a single device and a single strip make it possible to hot stamp different areas of the same part of a vehicle body with different decorative patterns.

The disclosed embodiments also relate to a part of a vehicle body obtained using the device and/or the method as described above.

The invention also relates to a vehicle comprising a part of a vehicle body obtained using the device and/or the method as described above.

Several disclosed embodiments will now be explained by way of non-limiting examples and with reference to the appended drawings, in which.

In the two described embodiments, the elements that are identical between the two embodiments have the same numerical reference.

FIRST EMBODIMENT (FIGS. 1 TO 3)

In this first embodiment, the device 1 in particular comprises a movable motorized arm 2, a head 3 mounted to be able to rotate on one end of the arm 2, and a strip 8.

Figure 1:
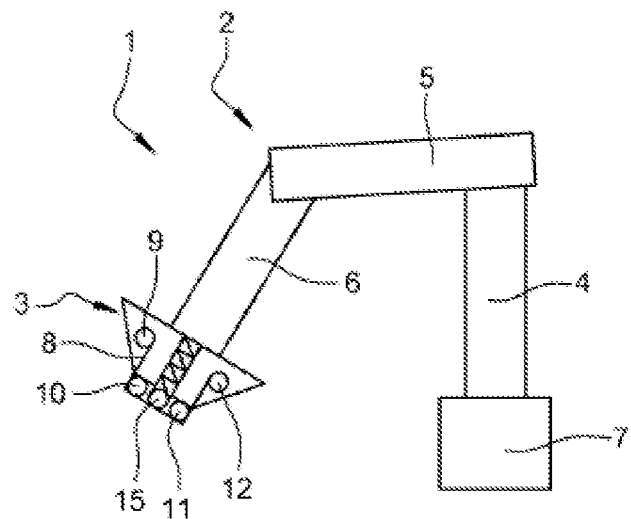
FIG. 1 is a schematic cross-sectional view of a device according to an embodiment.

The arm 2 comprises three main segments: a proximal segment 4, a medial segment 5 and a distal segment 6 (see FIG. 1). The three segments 4, 5, 6 are substantially identical to each other. They have a generally elongated shape and each have two longitudinal ends: a proximal end and a distal end. The proximal segment 4 is fixed to a frame 7 by its proximal end and is not movable relative to the latter. The proximal end of the medial segment 5 is rotatably mounted on the distal end of the proximal segment 4. The distal end of the medial segment 5 is rotatably mounted on the proximal end of the distal segment 6. This assembly allows the arm 2 to increase its movement possibilities and therefore to position itself so as to be able to hot stamp parts of a vehicle body having complex shapes and for which the use of a conventional device would be complicated or even impossible. It is of course possible to provide a lower or higher number of segments of the arm 2, for example two, four, five, six, seven, eight, nine or ten. It is also possible to provide that all of the segments are not substantially identical, for example that the segments have dimensions and/or shapes that are different from one another.

The head 3 is mounted to be able to rotate at the distal end of the distal segment 6.

Figure 2:
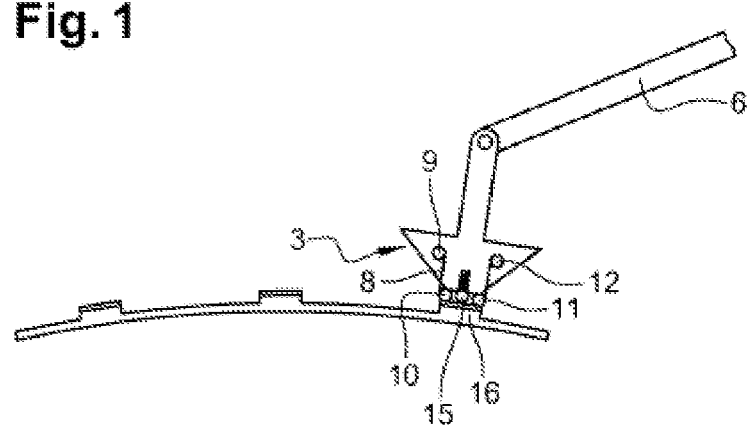
FIG. 2 is a schematic cross-sectional view of part of the device of FIG. 1 as well as of a part of a vehicle body intended to decorate.
Figure 3:
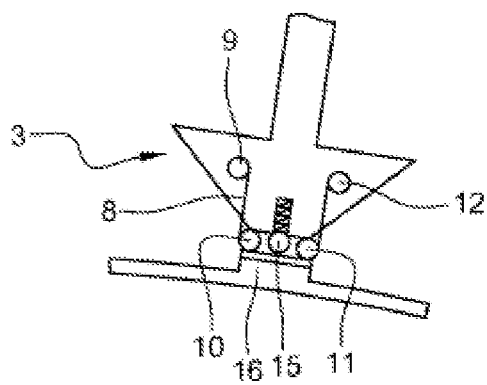
FIG. 3 is a schematic cross-sectional view of the head and of the part of a vehicle body to be decorated from FIGS. 1 and 2.
Figure 4:
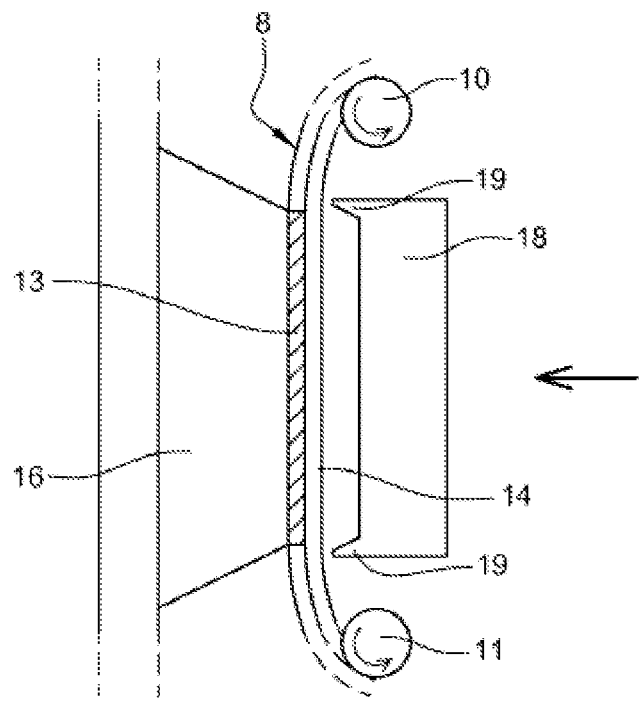
FIG. 4 is a schematic cross-sectional view of part of a head of a device according to a second embodiment as well as of a part of a vehicle body to be decorated.

The head 3 comprises means for unwinding the strip 8 in front of the head 3. The strip 8 shown in detail in FIG. 4 has a structure identical to the strip shown in a simplified manner in FIGS. 1 to 3. Thus, the reference numerals used for FIG. 4 (second embodiment) showing elements which are present but not visible in FIGS. 1 to 3 are used to describe the first embodiment. In the present case, the means for unwinding the strip 8 are formed by first, second, third and fourth rollers 9, 10, 11, 12. The first and fourth rollers 9, 12 are movable in rotation in a first direction of rotation and the second and third rollers 10, 11 are movable in rotation in a second direction of rotation, opposite the first direction of rotation. With reference to the side on which the device is shown in FIG. 1, the first and fourth rollers 9, 12 are movable in rotation in a clockwise direction and the second and third rollers 10 and 11 are movable in rotation in a counterclockwise direction. Each roller 9, 10, 11, 12 has an axis of rotation. The axes of rotation are all distinct from one another and parallel to one another. The second and third rollers 10, 11 are arranged at an outer surface of the head 3. The first and fourth rollers 9, 12 are present in a body of the head 3. The first roller 9 is the one on which the strip 8 is wound that is not yet used, that is to say which comprises at least a decorative film 13 and a carrier film 14. Between the first and second rollers 9, 10, the strip 8 has not yet been used and therefore still includes the decorative film 13 and the carrier film 14. Between the second and third rollers 10, 11, before the hot stamping has taken place, the strip 8 still has a decorative film 13 and a carrier film 14. After hot stamping, little or no decorative film 13 remains on the strip 8. The latter is then wound on the fourth roller 12. Throughout its journey from roller to roller, the strip 8 is kept taut by the rollers. Such a position facilitates the passage between the rollers 9, 10, 11, 12 and in particular prevents the strip 8 from disengaging from one of the rollers 9, 10, 11, 12. More particularly, the second and third rollers 10, 11 are able to stretch the strip 8 so that the portion of the strip 8 facing the area of the part of a vehicle body 16 intended to be decorated is substantially flat before the hot stamping takes place.

The decorative film 13 can be made of any material known to those skilled in the art as being capable of serving as a decorative film in a hot stamping method. It can include color pigments, holograms or be metallic. The decorative film 13 can for example be monochrome. Alternatively, the decorative film can comprise several different colors. Provision can also be made for the decorative film 13 not to be colored continuously, but rather discontinuously. Provision can be made for the decorative film 13 to represent a gradient of the same color or of several different colors. Provision can also be made for the decorative film 13 to include a pattern representing, for example, a particular geometric shape that can be repeated throughout the film 13. It is also possible to provide for several different patterns to follow one another throughout the decorative film 13, these patterns for example being able to differ in their shape and/or their color and/or their texture.

The carrier film 14 can be made of any material known to those skilled in the art as being capable of serving as a carrier film in a hot stamping method. In the present case, the carrier film 14 is made of poly(ethylene terephthalate) (PET).

Of course, it is possible to provide that the strip 8 comprises other films or layers, for example an adhesive layer, a protective layer such as a varnish, or a peelable layer making it possible to facilitate the separation of the decorative film 13 from the carrier film 14.

The head 3 also comprises pressure means 15 capable of applying pressure to the strip 8. In the present case, the pressure means 15 are able to apply pressure to a face of the carrier film 14 that is not in contact with the decorative film 13. The pressure applied by the pressure means 15 makes it possible to ensure a good impression of the decorative film 13 on the area of the part of a vehicle body 16 to be decorated.

The part of a vehicle body 16 to be decorated can be placed on a counter-support that prevents the part 16 from deforming or breaking under the effect of the pressure exerted by the device 1 during hot stamping.

One example of a method that can be used with the device 1 is as follows:
- a movement of the motorized arm 2 carrying the head 3 is controlled and a rotation of the head 3 relative to the arm 2 is controlled so as to have the head 3 facing a surface of the part of a vehicle body 16 intended to be hot stamped,
- pressure is applied of between 30 and 40 kg/cm$^2$ using the pressure means 15 on the strip 8 comprising the decorative pattern 13 pressed against the surface of the part of a vehicle body 16 intended to be hot stamped, and it is heated to a temperature of between 120° C. and 250° C., preferably between 200° C. and 215° C.

The movement of the motorized arm 2 is done by rotation of the segments 4, 5, 6 of the arm 2 with respect to one another. These movements make it possible to place the decorative film 13 of the strip 8 opposite the area of the body 16 intended to be hot stamped.

Provision can be made for the head 3 to be removably mounted on the arm 2 and for it to be replaced by another head 3 comprising a different decorative film 13.

Provision can also be made for the strip 8 to include a decorative film 13 comprising several decorative patterns that follow one another along the decorative film, at least one of the decorative patterns having a shape and/or a color and/or a texture that is different from the other decorative patterns. Thus, in order to hot stamp a part of a vehicle body 16 with different decorative patterns, it is not necessary to change the head 3, it is sufficient to unwind the strip 8 in front of the head 3 until the desired decorative pattern is placed next to the pressure means 15.

Figure 5:
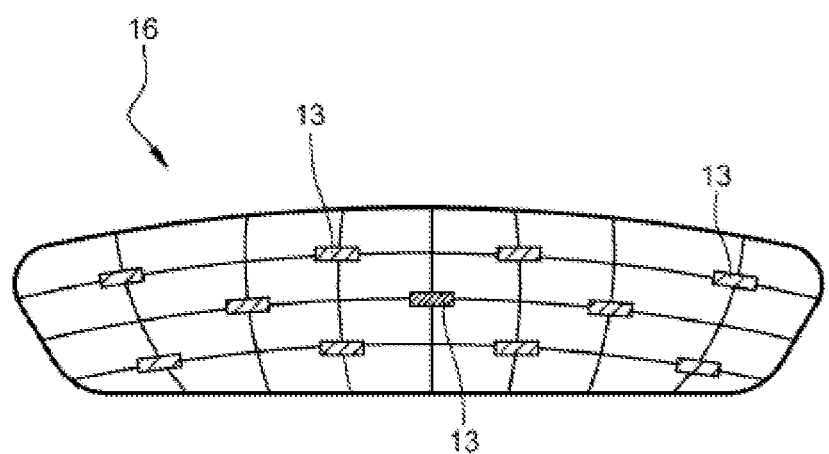
FIG. 5 is a schematic front view of a motor vehicle grille decorated with the device of FIG. 1 or 4.

One example of a part of a vehicle body 16 hot stamped, and therefore decorated, using the method according to an embodiment is shown in FIG. 5. The part has been decorated with different decorative films 13 owing in particular to the change of the head 3 during the hot stamping method.

SECOND EMBODIMENT (FIG. 4)

The device according to the second embodiment is identical to that of the first embodiment except that the pressure means 15 comprise a stamp 18. This stamp 18 is in contact with the face of the carrier film 14 which is not in contact with the decorative film 13. In the present case, the stamp 18 has a shape which is complementary to the shape of the area of the part of a vehicle body 16 intended to be hot stamped. The stamp 18 includes a peripheral projection 19. This peripheral projection 19 makes it possible to facilitate the detachment or cutting of the decorative film 13 without damaging the carrier film 14. Provision can be made for the stamp 18 to be removable and able to be replaced by another stamp, for example a stamp 18 which has another shape so as to be complementary with another area of the part of a vehicle body 16 to be decorated. The stamp 18 exerts pressure on the strip 8 through a rectilinear translational movement in a direction substantially perpendicular to a plane in which the portion of the strip 8 comprising the decorative film 13 intended to be applied is located.

The present disclosure is not limited to the embodiments described here, and other embodiments will become clearly apparent to a person skilled in the art.

It is for example possible to provide a device 1 and a method that are capable of simultaneously applying a decorative film 13 by hot stamping on several areas of the same part of a vehicle body 16 or different parts of a vehicle body. For example, provision can be made for the pressure means 15 to be able to apply pressure simultaneously to different places on the strip 8, these places corresponding to the areas to be decorated of the part of a vehicle body 16. Provision can also be made for the device 1 to comprise several pressure means 15 which are each capable of applying pressure to a respective area of the strip 8 corresponding to an area to be decorated of the part of a vehicle body 16.

What is claimed is:

1. Device for hot stamping a part of a vehicle body, characterized in that it comprises:
   a strip comprising a carrier film and a decorative film;
   at least one motorized arm capable of moving;
   at least one head mounted movably in rotation on one end of the arm, the head comprising pressure means capable of applying pressure on the strip; and
   an unwinder for unwinding the strip in front of the at least one head, wherein the at least one head includes the unwinder.

2. Device according to claim 1, wherein the decorative film comprises several decorative patterns that follow one another along the decorative film, at least one of the decorative patterns having a shape and/or a color and/or a texture that is different from the other decorative patterns.

3. Device according to claim 1, wherein the pressure means are capable of pressing the strip against the part of a vehicle body.

4. Device according to claim 3, wherein the pressure means are capable of being movable in rotation or in translation while applying pressure to the strip.

5. Device according to claim 1, wherein the head is removably mounted on the arm.

6. Device according to claim 5, wherein the at least one head further comprises the strip.

7. Device according to claim 6, wherein the unwinder is made up of a pair of rollers, and the pair of rollers being a first pair and the strip being a first strip, the head further comprises at least one second pair of rollers capable of unwinding a second strip and pressure means capable of applying pressure to the second strip.

8. Device according to claim 1, wherein the pressure means comprise at least one stamp.

9. Device according to claim 8, wherein the at least one stamp is able to cut at least a portion of the strip.

10. Device according to claim 8, wherein the at least one stamp is removably mounted on the head.

11. Device according to claim 8, wherein the at least one head comprises several stamps.

12. Device according to claim 11, wherein the several stamps are different in at least one of: dimensions and shapes.

13. Device according to claim 1, wherein the pressure means are suitable for applying a pressure of between 30 and 40 kg/cm2 on the strip.

14. Device according to claim 1, wherein the device further comprises a heater for heating the pressure means to a temperature between 120° C. and 250° C.

15. Hot stamping method using a device according to claim 1.

16. Hot stamping method according to claim 15, characterized in that:
   a movement of the at least one motorized arm carrying the at least one head is controlled and a rotation of the at least one head relative to the arm is controlled to have the at least one head facing a surface intended to be hot stamped,
   applying a pressure between 30 and 40 kg/cm2 using the pressure means on the strip comprising the decorative film pressed against the surface intended to be hot stamped, and heating to a temperature between 120° C. and 250° C.

17. Method according to claim 16, wherein the head is changed for another head after having hot stamped the surface intended to be hot stamped.

18. Method according to claim 16, wherein the pressure means further comprise a stamp corresponding to an area to be decorated, the method further comprising a step in which the stamp is changed for another stamp having at least one of: different dimensions and a different shape.

19. Method according to claim 16, wherein, the previous steps having made it possible to carry out hot stamping of the surface with one of the decorative patterns of the decorative film, the method further comprises the following steps:
   controlling a movement of the motorized arm carrying the at least one head and controlling a rotation of the at least one head relative to the arm to have the head facing a surface intended to be hot stamped that is different from the surface previously hot stamped,
   unwinding the strip in front of the at least one head so as to place a portion of the decorative film facing the pressure means, said portion comprising a decorative pattern having at least one of: a shape, a color, and a texture which is different from that of the decorative pattern previously applied,
   applying pressure between 30 and 40 kg/cm2 using the pressure means on the strip comprising the decorative pattern pressed against the surface intended to be hot stamped, and heating to a temperature between 120° C. and 250° C.

20. Device according to claim 1, wherein the device further comprises a heater for heating the pressure means to a temperature between 200° C. and 215° C.

21. Method according to claim 16, wherein the heating is performed at a temperature between 200° C. and 215° C.

22. Method according to claim 19, wherein heating is performed at a temperature between 200° C. and 215° C.

* * * * *